United States Patent [19]
Weingart et al.

[11] Patent Number: 6,008,303
[45] Date of Patent: Dec. 28, 1999

[54] POLYMERS SUITABLE AS DISPERSING RESINS

[75] Inventors: Franz Weingart, Leimen; Wolfgang Paulus, Mainz; Stephan Bauer, Hochdorf-Assenheim, all of Germany

[73] Assignee: BASF Aktiengesellschaft, Ludwigshafen, Germany

[21] Appl. No.: 09/101,687

[22] PCT Filed: Jan. 22, 1997

[86] PCT No.: PCT/EP97/00283

§ 371 Date: Jul. 15, 1998

§ 102(e) Date: Jul. 15, 1998

[87] PCT Pub. No.: WO97/27232

PCT Pub. Date: Jul. 31, 1997

[30] Foreign Application Priority Data

Jan. 25, 1996 [DE] Germany .................. 196 02 544

[51] Int. Cl.$^6$ .................................................. C08F 14/00
[52] U.S. Cl. ........................................................ 525/330.7
[58] Field of Search ........................................ 525/330.7

[56] References Cited

U.S. PATENT DOCUMENTS 3,506,574  4/1970  Stambaugh et al. .
5,412,047  5/1995  Georges et al. .

FOREIGN PATENT DOCUMENTS

96/00251  1/1996  WIPO .

*Primary Examiner*—Edward J. Cain
*Attorney, Agent, or Firm*—Keil & Weinkauf

[57] ABSTRACT

Polymers I suitable as dispersing resins are obtained by reacting
A. a polymer II obtained by reacting at least one compound III selected from the group consisting of
  a) an ester IV of
    a1) an α,β-unsaturated carboxylic acid V and
    a2) an alkyl alcohol VI of 1 to 25 carbon atoms,
  b) an ester VII of
    b1) vinyl alcohol and
    b2) a saturated carboxylic acid VIII of 1 to 4 carbon atoms,
  c) vinyl chloride
  d) styrene or vinyl benzenes which carry an alkyl group of 1 to 4 carbon atoms on the benzene ring, in the presence of a compound IX which contains an N-oxyl radical function, with
B. at least one compound X comprising
  a) 50 to 100% by weight, based on X, of at least one compound XI selected from the group consisting of
    a1) an ester XII of
      a) an α,β-unsaturated carboxylic acid XIII and
      b) an alkyl alcohol XIV of 2 to 10 carbon atoms which carries at least one polar or acidic group,
    a2) an amide XV of
      a) an α,β-unsaturated carboxylic acid XVI and
      b) ammonia or an amine XVII of 2 to 10 carbon atoms which carries at least one polar or acidic group,
    a3) N-vinyl compounds XVIII,
    a4) styrene sulfonic acid or vinylbenzenesulfonic acid which carries an alkyl group of 1 to 4 carbon atoms on the ring, and
  b) from 0 to 50% by weight based on X, of at least one compound XIX selected from the group consisting of
    b1) an ester XX of
      a) an α,β-unsaturated carboxylic acid XXI and
      b) an alkyl alcohol XXII of 1 to 25 carbon atoms,
    b2) an ester XXIII of
      a) vinyl alcohol and
      b) a saturated carboxylic acid XXIV of 1 to 4 carbon atoms,
    b3) vinyl chloride,
    b4) styrene or vinylbenzenes, which carry an alkyl group of 1 to 4 carbon atoms on the benzene ring, in the presence of a compound XXV which contains an N-oxyl radical function, polymer I containing from 10 to 90% by weight of II and in total from 10 to 90% by weight of X.

The polymer may be used as dispersing resins for pigment-containing coatings.

10 Claims, No Drawings

POLYMERS SUITABLE AS DISPERSING RESINS

The present invention relates to polymers I, which are suitable as dispersing resins and are obtained by reacting
A. a polymer II obtainable by reacting at least one compound III selected from the group consisting of
   a) an ester IV of
      a1) an α,β-unsaturated carboxylic acid V and
      a2) an alkyl alcohol VI of 1 to 25 carbon atoms,
   b) an esther VII of
      b1) vinyl alcohol and
      b2) a saturated carboxylic acid VIII of 1 to 4 carbon atoms,
   c) vinyl chloride
   d) styrene or vinyl benzenes which carry an alkyl group of 1 to 4 carbon atoms on the benzene ring, in the presence of a compound IX which contains an N-oxyl radical function, with
B. at least one compound X comprising
   a) 50 to 100% by weight, based on X, of at least one compound XI selected from the group consisting of
      a1) an ester XII of
         a) an α,β-unsaturated carboxylic acid XIII and
         b) an alkyl alcohol XIV of 2 to 10 carbon atoms which carries at least one polar or acidic group,
      a2) an amide XV of
         a) an α,β-unsaturated carboxylic acid XVI and
         b) ammonia or an amine XVII of 2 to 10 carbon atoms which carries at least one polar or acidic group or a group which can readily be converted into an acidic group,
      a3) N-vinyl compounds XVIII,
      a4) styrene sulfonic acid or vinylbenzene sulfonic acid which carries an alkyl group of 1 to 4 carbon atoms on the ring, and
   b) from 0 to 50% by weight based on X, of at least one compound XIX selected from the group consisting of
      b1) an ester XX of
         a) an α,β-unsaturated carboxylic acid XXI and
         b) an alkyl alcohol XXII of 1 to 25 carbon atoms,
      b2) an ester XXIII of
         a) vinyl alcohol and
         b) a saturated carboxylic acid XXIV of 1 to 4 carbon atoms,
      b3) vinyl chloride,
      b4) styrene or vinylbenzenes, which carry an alkyl group of 1 to 4 carbon atoms on the benzene ring, in the presence of a compound XXV which contains an N-oxyl radical function,
polymer I containing from 10 to 90% by weight of II and in total from 10 to 90% by weight of X.

The present invention, relates furthermore to the use of such polymers for pigment formulations and pigment-containing coatings, and to pigment formulations comprising a pigment and a polymer I.

Aqueous and organic suspensions which contain a pigment and a binder are widely used for the production of coatings (Ullmann's Encyclopedia of Industrial Chemistry, 5th Edition, Vol. 20, pages 243–369, VCH Publishers Inc., Weinheim-New York, 1992).

In such suspensions, the pigment should as a rule be and remain very finely divided; furthermore, it should be capable of being dispersed rapidly and moreover the suspensions should remain stable. Since these requirements cannot as a rule be met with pure pigments, it is advantageous first to convert the pure pigments into a corresponding suitable form for use, this generally being a pigment formulation with a dispersion resin.

Dispersing resins which are suitable in principle are polymers having polar, acidic or basic groups. In particular, inorganic pigments undergo addition at these anchor groups so that the organophilic moieties of the resin molecules project outward and thus make the pigment particles compatible with the binder in which they are embedded.

Although these dispersing resins can help to stabilize pigment dispersions, the dispersion stability is not sufficient for the particularly advantageous finely divided pigments.

U.S. Pat. No. 5,412,047 describes a polymer which may contain acidic or polar groups and can be prepared by reacting a very wide range of olefinically unsaturated compounds in any order and in any mixture, in the presence of a compound which contains an N-oxyl radical function.

However, such polymers have the disadvantage that they do not have strong affinity either to the usually hydrophilic pigments or to the generally organophilic binders. Thus, both the dispersing action and the anchoring of the pigments in the binder matrix is unsatisfactory, resulting in insufficient mechanical strength, in particular abrasion resistance, and weather resistance, in particular moisture resistance, of the pigment-containing coatings.

It is an object of the present invention to provide dispersing resins with which the disadvantages described can be overcome in a technically simple and economical manner.

We have that this object is achieved by the polymers I defined at the outset, their use for pigment formulations and pigment-coatings, and pigment formulations comprising a pigment and a polymer I.

Suitable esters IV are primarily esters of α,β-unsaturated carboxylic acids V of the formula

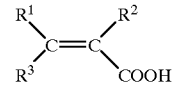

where $R^1$, $R^2$ and $R^3$ are each hydrogen or $C_1$–$C_4$-alkyl, acrylic acid and methacrylic acid being preferred. Mixtures of esters of different such carboxylic acids may also be used.

Suitable alcohol components VI in addition to the $C_8$–$C_{25}$-alcohols, such as 2-ethylhexanol, nonanol, stearyl alcohol and lauryl alcohol, are preferably the $C_1$–$C_7$-alcohols, in particular, methanol, ethanol, n-propanol, isopropanol, n-butanol, sec-butanol, tert-butanol, isobutanol, tert-butane-1-ol and mixtures of such alcohols.

Suitable esters VII are esters of vinyl alcohol and of a saturated carboxylic acid of 1 to 4 carbon atoms, such as formic acid, butyric acid and isopropyl carboxylic acid, in particular acetic acid and propionic acid. Mixtures of esters of different such carboxylic acids may also be used.

Other suitable compounds III are vinyl chloride, styrene or vinyl benzenes which carry an alkyl group of 1 to 4 carbon atoms on the benzene ring, such as 4-ethyl styrene. The polymers II may be composed of a compound III or a plurality of compounds III.

Suitable compounds IX which contain an N-oxyl radical function are 2,2,6,6-tetramethyl-1-piperidinyloxy (TEMPO), 4-oxo-2,2,6,6-tetramethyl-1-piperidinyloxy (4-oxo-TEMPO), 2,6-di-phenyl- 2,6-dimethyl-1-piperidinyloxy, 4-hydroxy-2,2,6,6-tetramethyl-1-piperidinyloxy, 2,2,5,5,-tetramethyl-1-pyrrolidinyloxy, 2,5-diphenyl-2,5-dimethyl-1-pyrrolidinyloxy, 3-carboxy-2,2,5, 5-tetramethyl-1-pyrrolidinyloxy and di-tert-butyl nitroxide, as well as compounds IX as described, for examPLe, in U.S. Pat. No. 5,412,047. Mixtures of different such compounds may also) be used.

The polymers II may be prepared by all known polymerization methods, for example by mass polymerization, emulsion polymerization and, preferably, solution polymerization.

Suitable solvents are alcohols, such as isopropanol, glycols, such as ethanediol, polyethylene glycol, polypropylene glycol, glycerol and dipropylene glycol, ethers, such as tetrahydrofuran (THF), dioxane and glycol ethers, N-alkylpyrrolidinones, N-alkylpyrrolidones, amides, such as dimethylacetamide, and dimethyl-formamide, organosulfides, sulfoxides, sulfores, ketones, such as acetone and methyl ethyl ketone, aliphatic ard aromatic hydrocarbons such as hexane and toluene, water and mixtures of such solvents.

The polymerization is carried out as a rule at elevated temperatures, advantageously at from 100 to 180° C., preferably from 110 to 175° C., in particular from 130 to 160° C.

The compound III may be introduced into the reaction mixture in one batch or in a plurality of batches, and, in the latter case, the batches may have the same composition or different compositions.

Advantageously, a free radical initiator may be added for initiating the reaction. Suitable initiators are 2,4-dimethyl-2,5-dibenzyl-peroxyhexane, tert-butyl-peroxybenzoate, di-tert-butyl diperoxyphthalate, methylethyl ketone peroxide, dicumyl peroxide, tert-butyl peroxycrotonate, 2,2-bis-tert-butyl (peroxybutane), tert-butyl peroxyisopropylcarbonate, 2,5-dimethyl-2,5-bis (benzoylperoxy)hexane, tert-butylperacetate, 2,4-pentanedione peroxide, di-tert-butyl peroxide, 2,5-dimethyl-2,5-di-(tert-butylperoxy)hexane, preferably tert-butyl peroxy 2-ethylhexanoate, tert-butyl peroxypivalate, tert-amyl peroxy-2-ethylhexanoate, in particular azobisalkylnitriles, such as azobisisobutyronitrile, and diaroylperoxides, such as dibenzoylperoxide, and mixtures of such compounds.

Particularly suitable initiators are those having a half life of 1 hour at from 60 to 90° C. and a half life of 10 hours at from 50 to 80° C. When initiators having a longer half life are used, promoters, such as tertiary amines, may advantageously be employed.

The molar ratio of the compound IX to the initiator should be from 0.5 to 5, preferably from 0.8 to 4.

The polymers II may be isolated from the reaction mixture by known methods, for example by precipitation or extraction, or may be used for further processing without isolation.

The polymers II should advantageously have a weight average molecular weight of more than 1000, preferably from 3000 to 30000, and a quotient of the weight average molecular weight to the number average molecular weight of less than 3, preferably less than 2.

Suitable esters XII are primarily esters of α,β-unsaturated carboxylic acids XIII of the formula

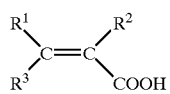

where, $R^1$, $R^2$ and $R^3$ are each hydrogen or $C_1$–$C_4$-alkyl, acrylic acid and methacrylic acid being preferred. Mixtures of esters of different such carboxylic acids may also be used.

Suitable alcohol components XIV are diols, such as 1,2-ethanediol, 1,3-propanediol, or 1,4-butane diol, polar substituted alcohols, such as N,N-dimethylaminoethanol and ethylene glycolmonoethyl ether, alcohols which carry acidic groups, such as 2-sulfoethanol isethionic acid) and 3-sulfopropanol, and mixtures of such alcohols.

Suitable amides XV are primarily amides of α,β-unsaturated carboxylic acids XVI of the formula

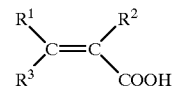

where $R^1$, $R^2$ and $R^3$ are each hydrogen or $C_1$–$C_4$-alkyl, acrylic acid and methacrylic acid being preferred. Mixtures of the amides of different carboxylic acids may also be used.

Suitable amine components are ammonia and amines XVII which carry at least one polar group, one acid group or one group which can readily be converted into an acidic group, such as salts, e.g. 2-methyl-2-aminopropanesulfonic acid, 2-aminoethanesulfonic acid, 3-aminopropanesulfonic acid and salts thereof, preferably metal salts, and mixtures of such amine components.

Suitable polar groups are primarily OH groups, tertiary amino groups and sulfonyl groups and suitable acidic groups are in particular the sulfonic acid, phosphonic acid, phosphoric acid and especially carboxyl groups.

Groups which are converted easily into acidic groups are, for example, the ester group or salts, preferably of the alkali metals, such as sodium or potassium.

Other suitable compounds XI are N-vinyl compounds XVIII, such as N-vinylformamide, N-vinylpyrrolidone, N-vinylcaprolactam, N-vinylimidazole, vinylbenzenesulfonic acids and vinylbenzene sulfonic acids which carry an alkyl group of, in particular, 1 to 4 carbon atoms on the benzene ring and mixtures of such compounds. The polymers I may contain a compound XI or a plurality of compounds XI.

Suitable esters XX are primarily esters of α,β-unsaturated carboxylic acids XXI of the formula

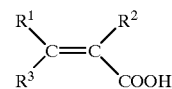

where $R^1$, $R^2$ and $R^3$ are each hydrogen or $C_1$–$C_4$-alkyl, acrylic acid and methacrylic acid being preferred. Mixtures of esters of different such carboxylic acids may also be used.

Suitable alcohol components XXII in addition to the $C_8$–$C25$-alcohols, such as 2-ethylhexanol, nonanol, stearyl alcohol and lauryl alcohol are preferably the $C_1$–$C_7$-alcohols, in particular methanol, ethanol, n-propanol, isopropanol, n-butanol, sec-butanol, tert-butanol, isobutanol, tert-butan-1-ol and mixtures of such alcohols.

Suitable esters XXIII are esters of vinyl alcohol and a saturated carboxylic acid of 1 to 4 carbon atoms, such as formic acid, butyric acid and isopropylcarboxylic acid, in particular acetic acid and propionic acid. Mixtures of esters of different such carboxylic acids may also be used.

Other suitable compounds XIX are vinyl chloride, styrene, vinyl benzenes which carry an alkyl group of 1 to 4 carbon atoms on the benzene ring, such as 4-ethylistyrene, and mitures of such compounds.

The amount by weight of the compound X should be from 10 to 90% by weight, based on the polymers I, and the amount by weight of the polymers II should be from 10 to 90% by weight, based on the polymers I, and the amount by weight of the compound XI should be from 50 to 100% by weight, based on the compound X, and the amount by weight of the compound XIX should be from 0 to 50% by weight, based on the compound X.

Suitable compounds XXV which contain an N-oxyl radical function are 2,2,6,6-tetramethyl-1-piperidinyloxy (TEMPO), 4-oxo-2,2,6,6-tetramethyl-1-piperidinyloxy (4-oxo-TEMPO), 2,6-diphenyl-2,6-dimethyl-1-piperidinyloxy, 4-hydroxy-2,2,6,6-tetramethyl-1-piperidinyloxy, 2,2,5,5-tetramethyl-1-pyrrolidinyloxy, 2,5-diphenyl-2,5-dimethyl-1-pyrrolidinyloxy, 3-carboxy-2,2,5,5-tetramethyl-1-pyrrolidinyloxy and di-tert-butyl nitroxide, as well as compounds IX as described, for example, in U.S. Pat. No. 5,412,047. Mixtures of different such compounds may also be used. Advantageously, compound XXV can have the same chemical composition as compound IX.

The polymers I may be prepared by all known polymerization methods, for example by mass polymerization, emulsion polymerization and, preferably, solution polymerization.

Suitable solvents are alcohols, such as isopropanol, glycols, such as ethanediol, polyethylene glycol, polypropylene glycol, glycerol and dipropylene glycol, ethers, such as tetrahydrofuran (THF), dioxane and glycol ethers, N-alkylpyrrclidinones, N-alkyl-pyrrolidones, amides, such as dimethylformamide, organosulfides, sulfoxides, ketones, such as acetone and methyl ethyl ketone, aliphatic and aromatic hydrocarbons, such as hexane and toluene, water and mixtures of such solvents.

The polymerization is carried out as a rule at elevated temperatures, advantageously at from 100 to 180° C., preferably from 110 to 175° C., in particular from 130 to 160° C.

Advantageously, the polymers II are initially taken for this purpose. The compound X can be introduced into the reaction mixture in one batch, in a plurality of batches or continuously; in the case of a plurality of batches, the batches may have the same composition or different compositions and, in the case of continuous addition, the composition of the compound X may remain constant or may change during the addition.

Advantageously, a free radical initiator may be added to initiate the reaction. Suitable initiators are 2,4-dimethyl-2,5-dibenzylperoxyhexane, tert-butyl-peroxybenzoate, di-tert-butyl diperoxyphthalate, methylethyl ketone peroxide, dicumyl peroxide, tert-butyl peroxycrotonate, 2,2-bis-tert-butyl (peroxybutane), tert-butyl peroxyisopropylcarbonate, 2,5-dimethyl-2,5-bis(benzoylperoxy)hexane, tert-butyl peracetate, 2,4-pentanedione peroxide, di-tert-butyl peroxide, 2,5-dimethyl-2,5-di-(tert-butylperoxy)hexane, preferably tert-butyl peroxy 2-ethylhexanoate, tert-butyl peroxypivalate, tert-amyl peroxy-2-ethylhexanoate, in particular azobisalkylnitriles, such as azobisisobutyronitrile, and diaroyl peroxides, such as dibenzoyl peroxide, and mixtures of such compounds.

Particularly suitable initiators are those having a half life of 1 hour at from 60 to 90° C. and a half life of 10 hours at from 50 to 80° C. If initiators having a longer half life are used, it may be advantageous to employ tertiary amines.

The molar ratio of the compound XXV to the initiator should be from 0.5 to 5, preferably from 0.8 to 4.

The polymers I may be isolated from the reaction mixture by known methods, for example by precipitation or extraction, or may be used for further processing without isolation.

The polymers I advantageously have a weight average molecular weight of more than 2000, preferably from 3000 to 50,000, and a quotient of weight average molecular weight to the number average molecular weight of less than 3, preferably less than 2.

In accordance with their stepwise preparation, the novel polymers I consist of an organophilic polymeric chain moiety (polymer II) and a hydrophilic chain moiety which carries acidic or polar groups. These acidic or polar groups have a strong affinity for many pigments, in particular inorganic oxide pigments, and therefore accumulate at their surface. Consequently, pigment formulations having an organophilic shell are obtained from the pigments and the polymers I by customary thorough mixing.

For the preparation of the pigment formulations, the pigments, in particular colored pigments, are mixed with the polymers I and, if required, additives in the absence of a solvent or, preferably, in the presence of an organic diluent in a manner known per se. Suitable diluents are hydrocarbons, in particular toluene and cylcohexane, ketones, in particular methyl ethyl ketone and cyclohexanone, esters, in particular ethyl acetate, and ethers, in particular tetrahydrofuran or dioxane. In some cases, water is also suitable. The pigment formulation may be isolated from the mixture by removing the diluent or may preferably be used for further processing without isolation.

The pigment formulations can be incorporated conveniently and without undesired agglomeration into organic binders.

For this purpose, the pigment formulations can be mixed, in a manner known per se, with a binder and, if required, additives, in the absence of a solvent or, preferably, in the presence of an organic diluent. Suitable organic solvents are hydrocarbons, in particular toluene, cyclohexane and n-alkanes, ketones, in particular methyl ethyl ketone, cyclohexanone and methylisobutyl ketone, esters, in particular, ethyl acetate, and ethers, in particular tetrahydrofuran and dioxane.

It is known that suitable binders are polyuret:hanes, polyacrylates, polymethacrylates, polyacrylamide, vinylpolymers such as polystyrene, polyvinyl chloride, polyvinyl acetate, polyvinyl propionate and polyacrylonitrile, cellulose-containing binders, such as cellulose esters, in particular cellulose nitrates, cellulose acetates, cellulose acetopropionate and cellulose acetobutyrate, phenoxy resins and epoxy resins.

It is known that the additives used are fillers, such as inorganic and organic pigments, e.g. alumina, silica, titanium dioxide, carbon black, polyethylene and polypropylene, chalking inhibitors, e.g. antimony oxide, and thixotropic substances, e.g. amorphous silica.

The mixtures of pigment formulation, binder and, if required, additives or solvents are used in a conventional manner as coating materials.

The coating materials may contain the novel pigment formulations alone or as a mixture with other pigments or pigment formulations.

We claim:

1. A polymer I which is suitable as a dispersing resin and is obtained by reacting
   A. a polymer II obtained by reacting at least one compound III selected from the group consisting of
      a) an ester IV of
         a1) an α,β-unsaturated carboxylic acid V and
         a2) an alkyl alcohol VI of 1 to 25 carbon atoms,
      b) an ester VII of
         b1) vinyl alcohol and b2) a saturated carboxylic acid VIII of 1 to 4 carbon atoms,
c) vinyl chloride
d) styrene or vinyl benzenes which carry an alkyl group of 1 to 4 carbon atoms on the benzene ring, in the presence of a compound IX which contains an N-oxyl radical function, with B. at least one compound X comprising
  a) 50 to 100% by weight, based on X, of at least one compound XI selected from the group consisting of
    a1) an ester XII of
      a) an α,β-unsaturated carboxylic acid XIII and
      b) an alkyl alcohol XIV of 2 to 10 carbon atoms which carries at least one polar or acidic group,
    a2) an amide XV of
      a) an α,β-unsaturated carboxylic acid XVI and
      b) ammonia or an amine XVII of 2 to 10 carbon atoms which carries at least one polar or acidic group or a group which can readily be converted into an acidic group,
    a3) N-vinyl compounds XVIII,
    a4) styrene sulfonic acid or vinylbenzenesulfonic acid which carries an alkyl group of 1 to 4 carbon atoms on the ring, and
  b) from 0 to 50% by weight based on X, of at least one compound XIX selected from the group consisting of
    b1) an ester XX of
      a) an α,β-unsaturated carboxylic acid XXI and
      b) an alkyl alcohol XXII of 1 to 25 carbon atoms,
    b2) an ester XXIII of
      a) vinyl alcohol and
      b) a saturated carboxylic acid XXIV of 1 to 4 carbon atoms,
    b3) vinyl chloride,
    b4) styrene or vinylbenzenes, which carry an alkyl group of 1 to 4 carbon atoms on the benzene ring, in the presence of a compound XXV which contains an N-oxyl radical function, polymer I containing from 10 to 90% by weight of II and in total from 10 to 90% by weight of X.

2. A polymer I as defined in claim 1, obtained from acrylic acid or methacrylic acid as carboxylic acid V.

3. A polymer I as defined in claim 1, obtained from methanol, ethanol, n-propanol, isopropanol, n-butanol, sec-butanol, tert-butanol or isobutan-1-ol as alkyl alcohol VI.

4. A polymer I as defined in any claim 1, obtained from vinyl acetate or vinyl propionate as ester VII.

5. A polymer I as defined in claim 1, obtained from acrylic acid or methacrylic acid as carboxylic acid XIII.

6. A polymer I as defined in claim 1, obtained from 3-sulfopropanol or 2-sulfoethanol as alkyl alcohol XIV.

7. A polymer I as defined in claim 1, obtained from acrylic acid or methacrylic acid as carboxylic acid XVI.

8. A polymer I as defined in claim 1, obtained from 2-amino-2-methyl-propane sulfonic acid, 2-aminoethane sulfonic acid or 3-aminopropane sulfonic acid as amine XVII or from a salt thereof.

9. Use of a polymer I as defined in claim 1 for pigment formulations and pigment-containing coatings.

10. A pigment formulation comprising a pigment and a polymer I as defined in claim 1.

\* \* \* \* \*

UNITED STATES PATENT AND TRADEMARK OFFICE
CERTIFICATE OF CORRECTION

PATENT NO.: 6,008,303

DATED: December 28, 1999

INVENTOR(S): WEINGART et al.

It is certified that error appears in the above-identified patent and that said Letters Patent is hereby corrected as shown below:

Col. 8, claim 4, line 15, delete "any".

Signed and Sealed this

Fifth Day of September, 2000

Attest:

Q. TODD DICKINSON

*Attesting Officer*

*Director of Patents and Trademarks*